March 9, 1926.                                    1,576,399
M. F. L. A. AYMARD
VARIABLE SPEED GEARING
Filed Oct. 16, 1923          3 Sheets-Sheet 1

Inventor
Malcolm F. L. A. Aymard
by P. Singer atty

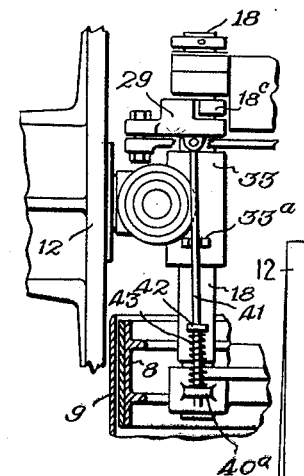
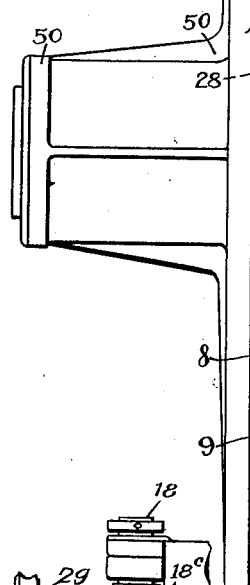
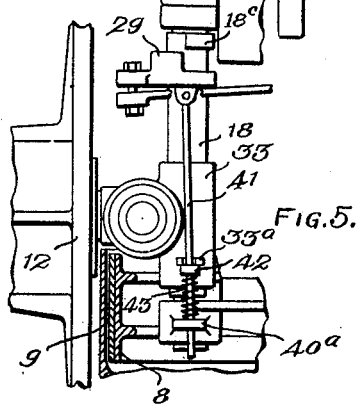
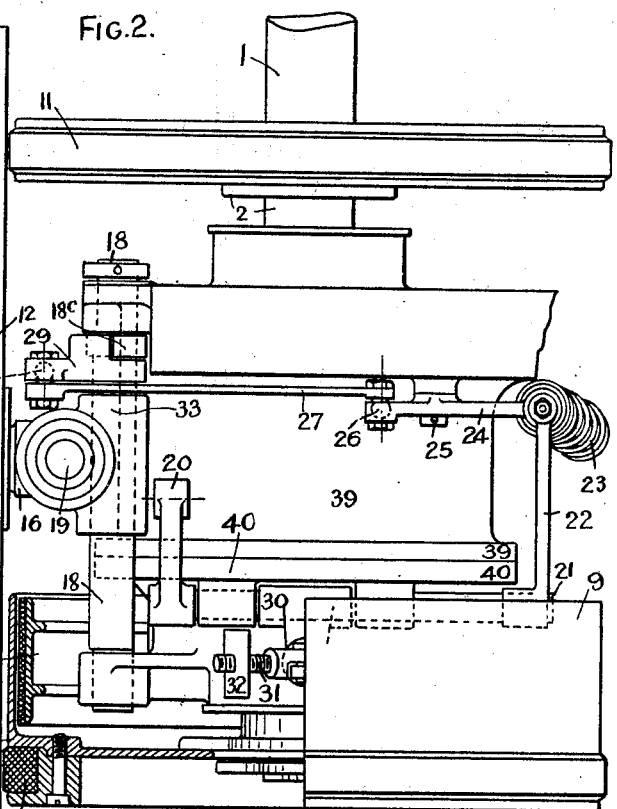

March 9, 1926.

M. F. L. A. AYMARD 1,576,399

VARIABLE SPEED GEARING

Filed Oct. 16, 1923

Inventor
Malcolm F.L.A. Aymard
by B Singer atty

Patented Mar. 9, 1926.

1,576,399

UNITED STATES PATENT OFFICE.

MALCOLM FOERSTER LAMBE AYME AYMARD, OF LONDON, ENGLAND.

VARIABLE-SPEED GEARING.

Application filed October 16, 1923. Serial No. 668,898.

*To all whom it may concern:*

Be it known that I, MALCOLM FOERSTER LAMBE AYME AYMARD, a subject of the King of Great Britain and Ireland, residing at Park House, Roehampton, London, S. W. 15, England, have invented certain new and useful Improvements in or Relating to Variable-Speed Gearing, of which the following is a specification.

This invention relates to variable speed and reversing gearing in which power is transmitted through a differential or epicyclic gear, the ratio and direction of transmission being controlled by a train of friction-wheels or discs. In gearing of the type with which the present invention is concerned the friction train comprises three discs or the like, two of which are in edge-on frictional engagement with the face of a third or intermediate disc at points on that face which are on a diameter thereof and at opposite sides of its centre. One of said discs is mounted for rotation by the power shaft or main driving-member of the transmission system. The two edge discs are connected respectively to the crown or sun wheels of a differential gear, the spider or equivalent member carrying the planet wheel or wheels constituting the main driven-member of the mechanism. The input and output ends of the transmission may of course be reversed in which case the driving member becomes the driven one and vice versa. In gearing of this kind the ratio and direction of transmission is varied by effecting relative movement between the edge discs and the intermediate one in a direction across the face of the latter.

Variable speed and reversing gearing of the type described above wherein the intermediate disc of the friction train is an "idler" is, according to the present invention, characterized in that the said idler is bodily movable in relation to the edge discs to vary the radii of their points of contact and so to vary the ratio and direction of transmission.

The term "idler" is used to signify that the intermediate disc does not form part of the main driving or driven members of the transmission system.

The above mechanism may according to the invention be further characterized in having, in combination, a clutch or brake movable into and out of engagement with one of the sun-wheels of the differential gear so as respectively to render that wheel stationary or to release it, and means to move the intermediate friction disc into and out of contact with the edge discs, said means being normally interconnected with operating mechanism for the said clutch or brake, so that the brake cannot be applied while the interconnection is established. Preferably means actuated by the translatory movement of the intermediate disc (or a part movable therewith) are provided to break the aforesaid interconnection when said disc reaches or passes a predetermined point in its traverse across the edge discs. The object of this provision will be fully described hereinafter.

A further feature of the invention resides in mounting the intermediate disc for rotation upon a spindle or the like which in turn is so supported as to be capable of pivotal movement about an axis which is at right angles to that of the spindle. The object of this construction will also be described hereinafter.

In one form of the invention the intermediate disc is supported on a carriage guided for translation along two shafts or the like, one of which is rotatable eccentrically to swing the intermediate disc into and out of contact with the edge-discs.

The foregoing and other features of the invention will be better understood from the following description, given by way of example, of one embodiment of the invention.

In the drawings

Figure 2 is an outside plan view, and

Figures 4 and 5 are plans partly in section of mechanism for breaking the connection between the actuating mechanism of the friction disc and the operating mechanism of the clutch or brake.

Like reference numerals indicate like parts in the various figures.

Figure 1:
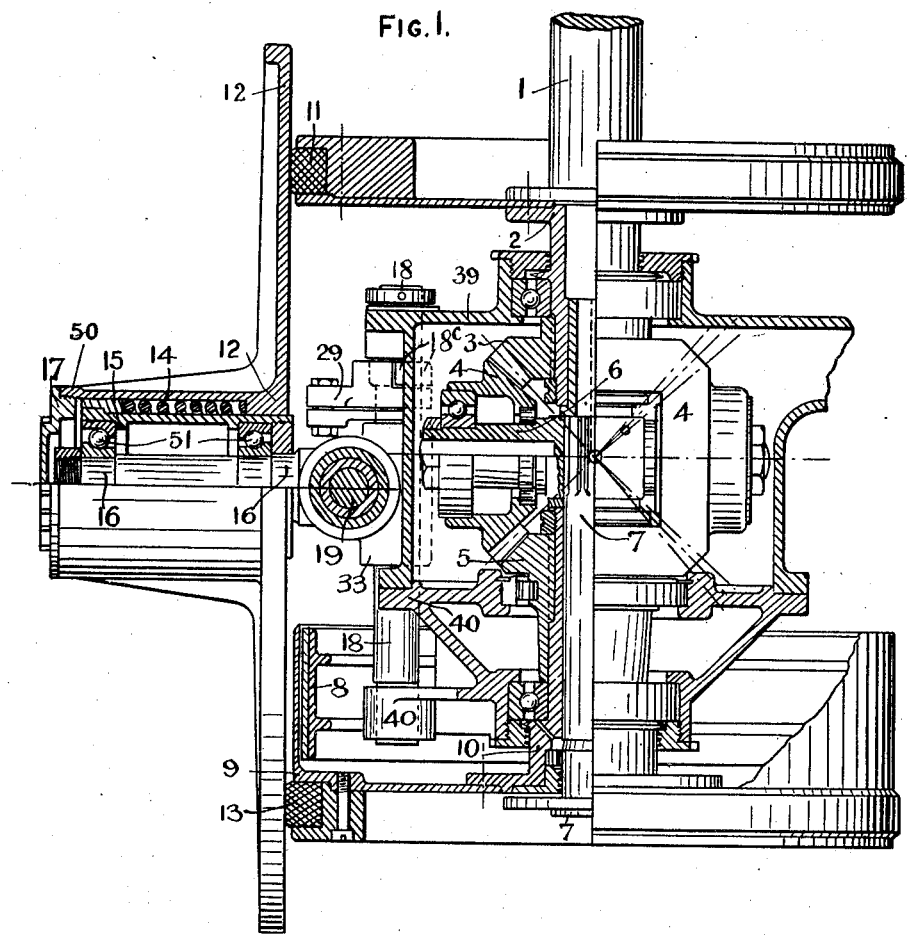
Figure 1 is a plan view, partly in section, of the gearing.

The shaft 1 constitutes the main driving shaft of the mechanism and rotatable solidly therewith is a friction disc 11 and the sun-wheel pinion 3 of a differential gear 3, 4, 5. The planet pinions 4 of this gear are carried on a cross member 6 rotatable with a shaft 7 which is the main driven shaft of the mechanism. The axes of the driving and driven shafts are, as will be seen, in alignment. The second sun-wheel pinion 5 of the gear is supported in external bearings and free to rotate about the driven shaft 7. The pinion 5 is connected by means of a sleeve 10 with a drum 9 co-operating with which is an internal expanding brake 8. A friction ring 13 is carried at the periphery of the drum. The members 11 and 13—hereinafter referred to as the "edge friction discs" or the "edge discs"—are of equal diameter and, under certain conditions, are intended to be engaged by the face of an intermediate disc 12 mounted for rotation about a spindle 16. The disc 12 is adapted to be moved into and out of contact with the edge discs and also to be moved across the latter to vary the radii of the points of contact of the edge discs with the face disc.

When the face disc 12 is withdrawn from engagement with the edge discs, the drum 9 (and consequently the pinion 5) is held stationary by the brake 8, the differential gear operates in known manner to effect a 2:1 reduction in speed. Obviously if the shaft 7 be made the driving member and the shaft 1 the driven member, the latter will rotate at twice the speed of the driver. When the brake 8 is withdrawn and the drum 9 thus free to rotate, the planet pinions will merely rotate about their own axes and the driven shaft 7 will remain stationary—this is the "free" position of the gearing.

The frictional control of the differential is brought into play when the brake 8 is "off" and the face disc 12 is in contact with the edge discs 11 and 13. The function of a frictional train of this type in controlling the speed of transmission by the differential gear is known, so that a detailed description of the operation of this part of the mechanism is unnecessary. It will be understood that if the discs 11 and 13 contact at equal radii of the disc 12, no drive will be transmitted to the shaft 7. If the disc 11 is at a greater radius, the pinion 3 will rotate at a speed greater than that of the pinion 5, and consequently the shaft 7 will be driven in the same direction as the driving shaft 1 and at a speed equal to half the difference between the speeds of the pinions 3 and 5. The speed of the driven shaft is increased as the difference in contact radii of the edge discs is increased. If the disc 11 operates at a smaller radius than the disc 13 the driven shaft will be rotated in a direction opposite to that of the driving shaft, and under this condition the gearing provides a "reversed" drive.

The means by which the face disc is moved into and out of engagement with the edge discs and traversed across the latter, will now be described.

The disc 12 is formed with a boss 50 adapted to embrace a sleeve 15 upon which the disc and boss can slide axially. The sleeve 15 is rotatable on ball bearings 51 located between the spindle 16 and the sleeve, and between the sleeve and the boss 50 is an annular space within which is housed a spring 14 in compression. The spring tends to force the disc 12 inwards but the extent of inward movement is limited by a cap 17 secured to the outer end of the disc boss. It will be seen that inward movement of the disc under the action of the spring will be arrested when the cap 17 comes into contact with the outer end of the sleeve 15. In the position shown in Figure 3 the disc 12 is assumed to be in contact with the edge discs, and it will be seen that a clearance is permitted between the cap 17 and the sleeve 15. This clearance is taken up by the spring when the face disc is moved out of contact, and the original clearance is adjusted (for example, by means of washers) so that it is less than the extent to which the face disc is thrown outwardly. In this way while the resilient action of the spring is not interfered with while the face disc is operative, the arrangement ensures that contact between the face and edge discs will be broken when the former is thrown outwardly.

The inner end of the spindle 16 is formed as a sleeve 52 which embraces a shaft 19 extending at right angles to the spindle. Between the spindle sleeve 52 and the shaft 19 are two bushes, one a tapered bush 34 adjacent to the shaft and the other an oppositely tapered split bush 37 encircling the bush 34. The bush 34 is secured to a bracket 35 abutting one end of the sleeve 52 while at the other end the sleeve is engaged by a bracket 33 secured to the shaft 19. The brackets 35 and 33 are mounted upon the shafts 36 and 18 respectively which extend parallel to the plane of the face disc. An annular space is provided between the broader end of the bush 37 and the adjacent portion of the bracket 33, and within this space is housed a spring 38 in compression. The foregoing arrangement allows the spindle 16 together with the face disc 12 carried thereby to swing about the axis of the shaft 19. This pivotal movement is opposed by virtue of the spring 38 and tapered bushes, but the movement permitted is sufficient to enable the disc 12 to accommodate itself to any difference in the diameters of the edge friction rings which may have been caused by uneven wear. By permitting this pivotal movement of the spindle 16 it will be seen also that the disc 12 can move within small limits in order to equalize the pressure exerted by the spring 14 when the edge discs contact therewith at different radii.

The guide shaft 36 is stationary but the shaft 18 is rotatable eccentrically, and it is by rotation of this shaft that the disc 12 is moved into and out of contact with the edge discs. Sufficient clearance is allowed between the inner end of the bush 34 (and the corresponding end of the sleeve 52) and the adjacent portion of the bracket 33 to permit of the relative sliding movement between the spindle sleeve 52 and the bracket 33 necessary to accommodate rotation of the shaft 18. Rotation of the shaft 18 is controlled by a lever 29 which is formed with a projection adapted, under certain conditions, to engage with a cam 18c on the eccentric shaft 18 (see Figures 2 and 3). The lever 29 is connected by means of a ball joint 28 to one end of a rod 27, the other end of which is coupled by a similar joint to one arm of a bell crank lever 24. The lever 24 is pivotally mounted at its fulcrum to a fixed part of the mechanism frame. The other arm of the bell crank is coupled by means of a short link to a radial arm 22 extending from the shaft 21. The arm 22 and that end of the bell crank with which it is linked are downwardly constrained by means of a tension spring 23. At that end of the shaft 21 remote from the arm 22 is an operating lever 20.

Figure 3:
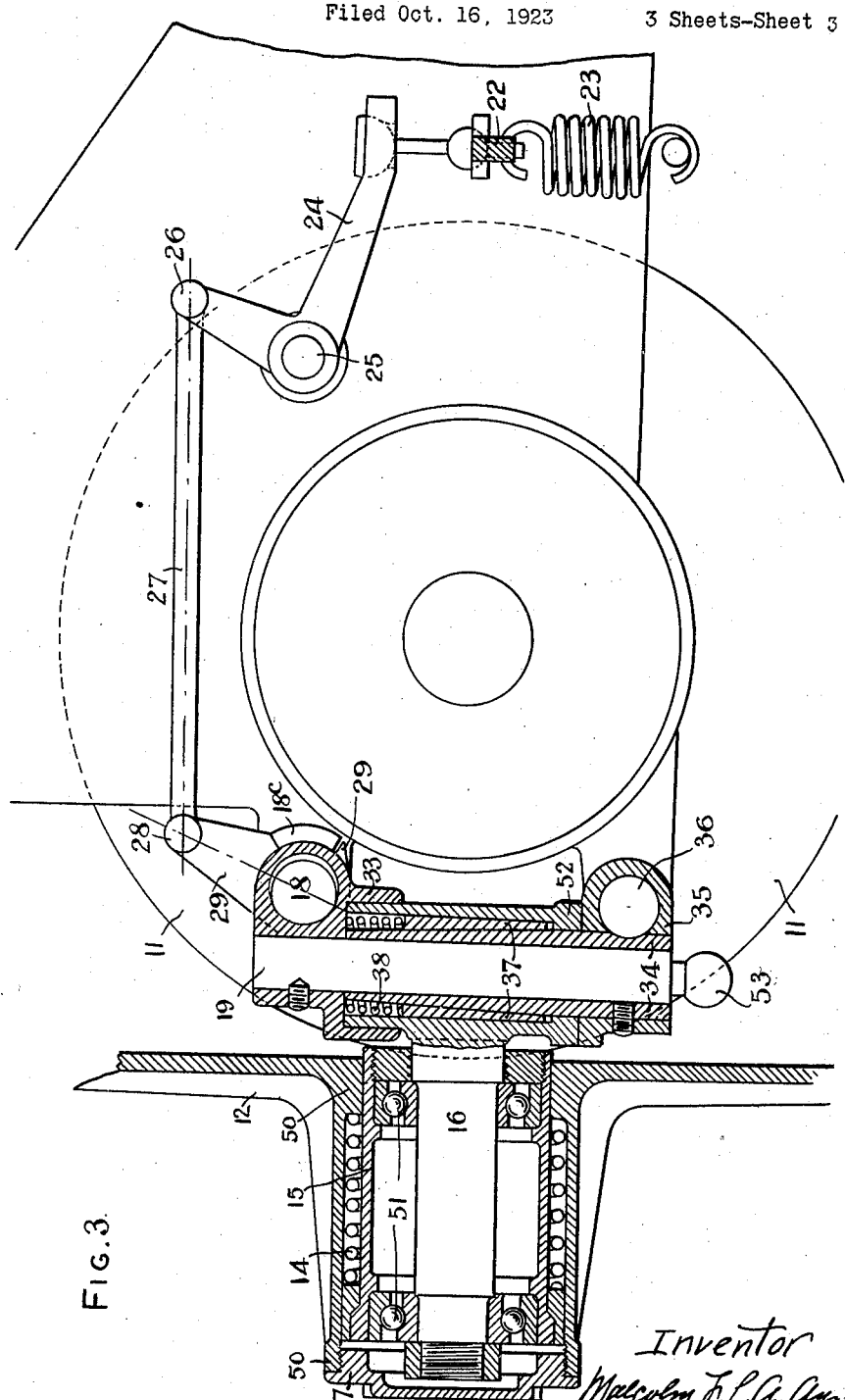
Figure 3 is an elevation, partly in section.

Assuming the parts in the relative position shown in Figure 3, it is necessary, in order to disengage the face disc to raise the control lever 20. By means of the linkage just described the lever 29 is thrown outwardly and by virtue of the engagement of the lever with the cam 18c the eccentric shaft is rotated through approximately one half a revolution (or less, if desired), and the face disc is consequently moved out of engagement. Similarly, when the arms 20 and 22 are moved downwardly the eccentric shaft is thrown inwards and the face disc thus brought into engagement.

Extending from the shaft 21 in the opposite direction to the control lever 20 is a radial arm 30 which controls the operation of the internal expanding brake 8. The brake-operating mechanism is such that the brake is brought into play on upward movement of the arm 30, i. e. on downward movement of the lever 20. It will thus be seen that the brake-operating means are interconnected with the mechanism for throwing the face disc into and out of engagement. The inward throw of the shaft 18 is limited by the clearance allowed between the bracket 33 and the adjacent ends of the sleeve 52 and bush 34. While the lever 29 is in engagement with the cam 18c, the inward movement of the lever is also limited in this respect. This limit is so fixed that the arm 22 (connected by the linkage described, to the lever 29) is prevented from downward movement sufficient to engage the brake 8. The parts are in this condition in Figure 3. It will thus be seen that while the eccentric shaft 18 is at the inner limit of its throw and the face disc 12 operative, the brake 8 cannot be put on.

When it is desired to alter the radii at which the edge discs contact and so to vary the speed, the control lever 20 is raised, against the action of the spring 23, and by means of the linkage 22, 24, 27 and 29, the eccentric shaft is thrown outwards and consequently the face disc moved out of contact. When the tension of the spring 23 is relieved, the springs 38 and 14 will assist in throwing the eccentric shaft outwards. It is preferred, however, to connect the bell crank 24 positively with the arm 22 in order to make sure that the eccentric is thrown outwards as the arm 22 is raised.

The face disc is now free to be traversed along the guides provided by the shafts 36 and 18. A projection 53 is formed at one end of the shaft 19 and any suitable mechanism may be linked to this projection for the purpose of traversing the disc. It will be understood that as the speed ratio is increased by movement of the face disc 12 from, say, right to left in Figure 1 it is desirable that the mechanical 2:1 drive should become operative at the end of the discs' traverse in this direction. To this end, therefore, means are provided for disengaging the connection between the lever 29 and the cam 18c at a predetermined point in the travel of the disc, and so at this point, allow of the brake 8 being rendered operative. When engagement between the lever and the cam is broken the spring 23, acting through the arms 22 and 30, automatically throws the brake into engagement. It will be appreciated that the face disc is out of engagement when the disconnection of the lever and cam which enables the spring 23 to act, is effected. This arrangement, therefore, ensures that when the mechanical drive is brought into play the friction drive is inoperative. When the brake is next released by raising the arm 22, the lever 29 and cam 18c are again brought into engagement.

Any convenient means operable by the translational movement of the disc 12 may be provided in order to break the connection between the lever 29 and the cam 18c. For example the lever 29 may be furnished with a rod 41 (preferably adjustable as to its operative length) pivotally connected at one end with the lever 29 as shown in Figs. 4 and 5 and passing with its opposite end through a stationary guide lug 40a. A spring 43 encircling the rod 41 between the lug 40a and an adjustable collar 42 keeps the lever 29 in engagement with the cam 18c as shown in Fig. 4 but when the disc 12 with the bracket 33 reaches a predetermined point in its traverse along the shaft 18, a head or projection 33a on the bracket 33, by bearing against the collar 42, compresses the spring 43 and withdraws the lever 29 from engagement with the cam 18° so breaking the connection of the lever with the cam as shown in Fig. 5.

The differential gear is enclosed within a casing 39 provided with a removable end cover 40. The casing is preferably oil-tight and as will be seen it also furnishes support for the guide shafts 18 and 36.

When the disc 12 is thrown out of engagement with the edge discs it is desirable that the rotational movement of the disc 12 should not immediately be arrested. In the present construction it will be seen that when the face disc is dis-engaged the sleeve 15 is brought into abutment with the cap 17. As both these members are rotating at the time of their engagement, the disc and sleeve will continue to rotate about the axis of the spindle 16 on the ball bearings provided. Thus, the face disc when again brought into engagement with the edge discs, will be rotating and as will be appreciated the disadvantage of starting up a stationary disc is thereby avoided.

In place of the mechanism described above for moving the face disc into and out of engagement other means, for example, hydraulically operated, may be employed.

The mechanism herein described may be employed in the power transmission systems of motor vehicles, in machine tools and for other purposes for which gearing of this type is used.

I claim:

1. A drive shaft, a friction disk and sun pinion, revoluble therewith, a driven shaft having a cross member, planet gears mounted on said cross member and engaging said sun pinion, a brake drum loose on the shaft, a friction disk fast with said drum, a second sun pinion fast with said drum and engaged by said planet gears, a friction disk revoluble on an axis at right angles to that of said shafts, movable into and out of engagement with the first-named friction disks and also movable laterally with respect thereto, a brake element for coaction with said brake drum, means for moving said last named friction disk, means for operating said brake element, and common actuating means for said brake element operating means and said friction disk moving means.

2. A pair of alined shafts, independently revoluble, gears connecting said shafts together and including a gear fast on one shaft, a gear loose on the other shaft, a carrier member, and a planet gear mounted on said carrier member and engaging said fast and loose gears, a friction disk fast with said fast gear; a brake drum and a friction disk fast with said loose gear; a third friction disk mounted on an axis at right angles to the alined shafts, shiftable with said axis laterally with respect to said first-named disks and also movable into and out of contact with said first named disks; means for shifting and moving said third friction disk; a brake element for coaction with the brake drum, and operating means for said brake element.

3. A pair of alined shafts, independently revoluble; gears connecting said shafts together and including a gear fast on one shaft, a gear loose on the other shaft, a carrier member, and a planet gear mounted on said carrier member and engaging said fast and loose gears, a friction disk fast with said fast gear; a brake drum and a friction disk fast with said loose gear; a third friction disk mounted on an axis at right angles to the alined shafts, shiftable with said axis laterally with respect to said first-named disks and also movable into and out of contact with said first-named disks; means for shifting and moving said third friction disk; including means to break connection between the disks when the third disk reaches a predetermined point in its lateral movement, a brake element for coaction with the brake drum, and operating means for said brake element.

4. Variable speed and reversing gearing according to claim 2, in which the axis of the third friction disk is mounted for pivotal movement with respect to an axis at right angles to its own.

5. A pair of alined shafts, independently revoluble; gears connecting said shafts together and including a gear fast on one shaft, and a gear loose on the other shaft, a carrier member, and a planet gear mounted on said carrier member and engaging said fast and loose gears, a friction disk fast with said fast gear; a brake drum and a friction disk fast with said loose gear; a third friction disk mounted on an axis at right angles to the alined shafts, shiftable with said axis laterally with respect to said first-named disks and also movable into and out of contact with said first-named disks; means for shifting and moving said third friction disk, a brake element for coaction with the brake drum, and operating means for said brake element, the axis of the third friction disk being mounted for pivotal movement with respect to an axis at right angles to its own, and yieldable means opposing said pivotal movement.

6. A pair of alined shafts, independently revoluble; gears connecting said shafts together and including a gear fast on one shaft, and a gear loose on the other shaft, a carrier member, a planet gear mounted on said carrier member and engaging said fast and loose gears, a friction disk fast with said gear; a brake drum and a friction disk fast with loose gear; a third friction disk mounted on an axis at right angles to the alined shafts, shiftable with said axis laterally with respect to said first-named disks and also movable into and out of contact with said first named disks; means for shifting and moving said third friction disk, a brake element for coaction with the brake drum, operating means for said brake element, the axis of the third friction disk being mounted for pivital movement with respect to an axis at right angles to its own, and yieldable means opposing said pivotal movement and including a spring to yieldingly press the third disk against the other disks.

7. A pair of alined shafts, independently revoluble; gears connecting said shafts together and including a gear fast on one shaft, and a gear loose on the other shaft, a carrier member, and a planet gear mounted on said carrier member and engaging said fast and loose gears, a friction disk fast with said fast gear; a brake drum and a friction disk fast with said loose gear; a third friction disk mounted on an axis at right angles to the alined shafts, shiftable with said axis laterally with respect to said first-named disks and also movable into and out of contact with said first-named disk; means for shifting and moving said third friction disk, a brake element for coaction with the brake drum, operating means for said brake element, the axis of the third friction disk being mounted for pivotal movement with respect to an axis at right angles to its own, and yieldable means opposing said pivotal movement and including a spring to yieldingly press the third disk against the other disks, and also including a stop to limit the extent of such movement.

8. A pair of alined shafts, independently revoluble, gears connecting said shafts together and including a gear fast on one shaft, and a gear loose on the other shaft, a carrier member, and a planet gear mounted on said carrier member and engaging said fast and loose gears, a friction disk fast with said fast gear; a brake drum and a friction disk fast with said loose gear; a third friction disk mounted on an axis at right angles to the alined shafts, shiftable with said axis laterally with respect to said first-named disks and also movable into and out of contact with said first-named disks; means for shifting and moving said third friction disk, a brake element for coaction with the brake drum, and operating means for said brake element, and a casing providing bearings for said shafts, also enclosing said shaft connecting gears, and forming a support.

In testimony whereof I have affixed my signature.

MALCOLM FOERSTER LAMBE AYME AYMARD.